United States Patent
Baranowski et al.

(10) Patent No.: US 12,157,254 B2
(45) Date of Patent: Dec. 3, 2024

(54) METHOD FOR PRODUCING A HOLLOW BODY COMPOSITE COMPONENT, AND MANDREL FOR USE IN SUCH A METHOD

(71) Applicant: Ford Global Technologies, LLC, Dearborn, MI (US)

(72) Inventors: Thomas Baranowski, Würselen (DE); Maik Broda, Würselen (DE); Pascal Rebmann, Weilerswist (DE); Markus Franzen, Stolberg (DE)

(73) Assignee: Ford Global Technologies, LLC, Dearborn, MI (US)

( * ) Notice: Subject to any disclaimer, the term of this patent is extended or adjusted under 35 U.S.C. 154(b) by 90 days.

(21) Appl. No.: 17/317,579

(22) Filed: May 11, 2021

(65) Prior Publication Data
US 2021/0354352 A1    Nov. 18, 2021

(30) Foreign Application Priority Data
May 13, 2020   (DE) .......................... 102020206045.2

(51) Int. Cl.
  *B29C 45/00*    (2006.01)
  *B29C 45/14*    (2006.01)
  (Continued)

(52) U.S. Cl.
  CPC .... *B29C 45/14631* (2013.01); *B29C 45/0001* (2013.01); *B29C 45/2628* (2013.01); *B29K 2101/12* (2013.01); *B29K 2105/106* (2013.01)

(58) Field of Classification Search
  CPC .... B29C 2045/14524; B29C 14/14631; B29C 2045/14057; B29C 45/0005;
  (Continued)

(56) References Cited

U.S. PATENT DOCUMENTS 3,778,898 A * 12/1973 Gruss ................ B32B 17/10376
                                                    219/544
6,368,537 B1 * 4/2002 Sato .................. B29C 45/14778
                                                    264/261
(Continued)

FOREIGN PATENT DOCUMENTS

DE    4023967 C1 *  7/1990
DE    19722727       12/1998
(Continued)

OTHER PUBLICATIONS

English translation of WO-2019007983-A1 (Year: 2019).*
(Continued)

*Primary Examiner* — Larry W Thrower
*Assistant Examiner* — John W Hatch
(74) *Attorney, Agent, or Firm* — Burris Law, PLLC

(57) ABSTRACT

A hollow body composite component is produced by a method using an injection mold, wherein a cavity of the injection mold is filled at least partially with a flowable material by injection of the flowable material, and a mandrel is driven through the flowable material to form a hollow body. Using the mandrel, at least one strip-shaped reinforcing element is introduced into a hollow body interior and is arranged on a surface of the hollow body facing the hollow body interior.

18 Claims, 2 Drawing Sheets

Figure 1:
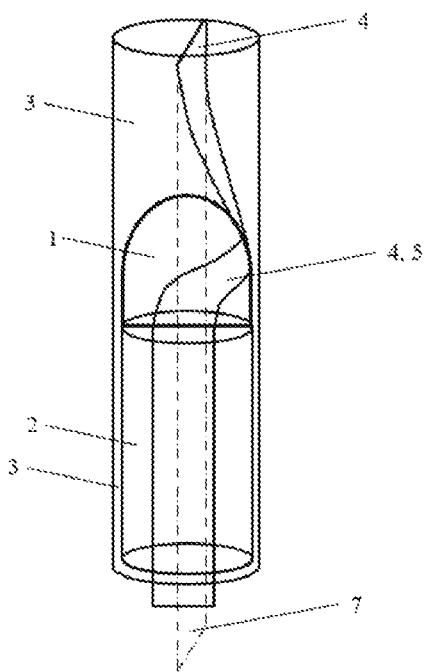

(51) Int. Cl.
   *B29C 45/26*   (2006.01)
   *B29K 101/12*  (2006.01)
   *B29K 105/10*  (2006.01)
(58) Field of Classification Search
   CPC ... B29C 45/14008; B29C 63/32; B29C 63/30;
              B29C 63/16; B29C 45/00; B29C 63/26;
              B29L 2022/00; B29L 2023/00
   USPC ........................................................ 264/266
   See application file for complete search history.

(56) References Cited

U.S. PATENT DOCUMENTS

| | | | | |
|---|---|---|---|---|
| 7,200,921 B2* | 4/2007 | Loibl | ................ | B32B 17/10036 |
| | | | | 219/203 |
| 2009/0169826 A1* | 7/2009 | Kuerschner | ....... | B29C 45/14639 |
| | | | | 428/172 |
| 2012/0275884 A1* | 11/2012 | Beck | ................ | B29C 45/14008 |
| | | | | 414/222.01 |
| 2013/0099405 A1* | 4/2013 | Kraemer | ................ | B29C 70/48 |
| | | | | 425/149 |
| 2017/0001349 A1* | 1/2017 | Holbrook | .......... | B29C 45/14008 |
| 2019/0283294 A1* | 9/2019 | Koch | ................ | B29C 45/14598 |
| 2020/0061952 A1* | 2/2020 | Nakayama | ............ | B29C 70/081 |
| 2020/0240656 A1* | 7/2020 | Jean | ................ | B29C 45/14065 |

FOREIGN PATENT DOCUMENTS

| | | | | |
|---|---|---|---|---|
| DE | 102011015522 | 10/2012 | | |
| DE | 102012018189 | 5/2014 | | |
| DE | 102014226500 | 6/2016 | | |
| WO | WO-2019007983 A1 * | 1/2019 | ............. | B29C 43/18 |

OTHER PUBLICATIONS

English translation of WO-2019007983-A1 (Year: 2019) (Year: 2019).*

EPO translation of DE 4023967 C1 (Year: 1990).*

* cited by examiner

METHOD FOR PRODUCING A HOLLOW BODY COMPOSITE COMPONENT, AND MANDREL FOR USE IN SUCH A METHOD

CROSS-REFERENCE TO RELATED APPLICATIONS

This application claims priority to and the benefit of German Patent Application No. 102020206045.2, filed on May 13, 2020. The disclosure of the above application is incorporated herein by reference.

FIELD

The present disclosure relates to method for producing a hollow body composite component using an injection mold.

BACKGROUND

The statements in this section merely provide background information related to the present disclosure and may not constitute prior art.

"Fluid injection technology" is understood to mean production processes in which hollow bodies are produced by filling an injection mold with a melt, usually a plastics melt, in a first step. A mandrel is then driven through the still liquid melt. The driving force results from a fluid which drives the mandrel forward under pressure and is discharged again from the hollow space thus formed after the end of the process. Depending on the application, the mandrel can remain in the hollow body or can be reused.

German Patent No. 102014226500 A1 discloses methods which use a special projectile for producing hollow bodies by the fluid injection method. In this case, the projectile has at least one spacer means, whereby the projectile is guided at a substantially uniform distance from a mold wall. The method produces the hollow body by first placing the projectile on a fluid injector in a cavity of a multi-part mold. The mold is then closed, and a flowable plastic is injected into the cavity of the tool. This is followed by the formation of a fluid-filled hollow space within the plastic, wherein the projectile is driven through the flowable plastic by a fluid introduced by the fluid injector. By displacement of the flowable plastic, a hollow space is created by the projectile, while the hollow space is filled with fluid. The plastic then solidifies and the fluid is discharged from the cavity. Finally, the hollow body is removed from the cavity by opening the mold.

German Patent No. 102011015522 A1 discloses plastic bodies which comprise a hollow body with solid bodies connected thereto. The plastic body is formed as a tubular hollow body in a central region. The tubular hollow body is closed at each of the two ends by a closed solid body. Arranged at a first end of the tubular hollow body is a displacement body, which is arranged at the transition from the hollow body to the first solid body. At a second end of the tubular hollow body, a hollow space is formed which extends between the tubular hollow body and the second solid body. For a production plant for producing a corresponding tubular plastic body in an injection molding process, it is envisaged that the cavity has an elongate shape with a first end and a second end, and that the injector nozzle is arranged between the ends of the cavity.

Common to all known hollow bodies is the fact that they comprise the plastic used in injection molding. Therefore, the mechanical properties of the hollow body material are limited to the properties of the plastic used and generally cannot be subjected to particularly high loads.

SUMMARY

This section provides a general summary of the disclosure and is not a comprehensive disclosure of its full scope or all of its features.

The present disclosure comprises a method for producing a hollow body composite component with improved mechanical properties, and a mandrel for producing such a hollow body composite component.

It should be noted that the features listed individually in the claims can be combined with one another in any technically feasible manner (even across category limits, for example between method and device) and indicate further variations of the disclosure. The description additionally characterizes and specifies the disclosure, in particular in conjunction with the figures.

It should furthermore be pointed out that a conjunction "and/or" used herein, located between two features and linking them to one another, must always be interpreted in such a way that in a first variation of the subject matter according to the present disclosure only the first feature may be present, in a second variation only the second feature may be present, and in a third variation both the first and the second feature may be present.

In the present disclosure, one or more strip-shaped reinforcing elements is/are introduced into a hollow body composite component produced by the fluid injection method. If a strip-shaped reinforcing element has a high mechanical stability, such a strip-shaped reinforcing element can positively influence and improve the mechanical properties of the hollow body composite component produced by the fluid injection method. Provision can also be made for the stability-improving properties of the reinforcing element to have an effect only in the composite material of the composite component, while the strip-shaped reinforcing element as such does not necessarily have to have a high mechanical stability.

In a method according to the present disclosure for producing a hollow body composite component using an injection mold, a cavity of the injection mold is filled at least partially with a flowable material by injection of the material, and a mandrel is driven through the flowable material in order to form a hollow body. The method is characterized in that, using the mandrel, at least one strip-shaped reinforcing element is introduced into a hollow body interior and is arranged on a surface of the hollow body facing the hollow body interior. The injection mold represents a negative shape of the geometry to be produced. In addition to the negative mold of the hollow body composite component, the injection mold frequently comprises further regions such as, for example, integrally formed portions, as well as inlet and outlet regions for the flowable material. Multi-part variations of the injection mold are customary, but other variations may also be employed. Depending on the complexity of the body, a multi-part injection mold may be advantageous when demolding the bodies.

Suitable flowable materials include all materials which can first be converted into a liquid state and can then harden. Thermoplastic materials which are heated above their melting point in order to obtain a flowable material are usually suitable here. Subsequent hardening takes place through the cooling of the material. An injection molding process can also be carried out on the same principle with metals. Materials which cure by chemical reaction can likewise be used.

During the injection of the flowable material, the cavity does not have to be filled completely with the material, and partial introduction of the flowable material may also be desired since a mandrel is subsequently driven through the flowable material, displacing some of the flowable material to form the hollow space. During this process, the displaced flowable material is at least partially introduced into the previously unfilled part of the cavity.

Before the mandrel is driven through, however, the cavity may be completely filled with the flowable material. The mandrel itself is driven through the flowable mass by an additional fluid, wherein the fluid fills the hollow body formed by the mandrel. After the originally flowable material has hardened, the fluid is discharged. The mandrel can then remain in the hollow body composite component or be removed therefrom. Reuse of the mandrel is possible. According to the present disclosure, the mandrel introduces at least one strip-shaped reinforcing element into the hollow body, said reinforcing element improving the mechanical properties of the hollow body composite component produced in this way. For this purpose, the strip-shaped reinforcing element is arranged on the inside of the hollow body by the mandrel. In this case, the inside of the hollow body can be the surface of the hollow body composite component which is produced by the mandrel being driven through.

According to a first variation of a method according to the present disclosure, the strip-shaped reinforcing element can comprise fibers, for example unidirectionally aligned fibers, which are embedded in a matrix of plastic, in particular thermoplastic. A strip-shaped reinforcing element comprising fibers can contribute to the desired improvement in the mechanical properties of the hollow body composite component. Natural fibers and/or mineral fibers and/or synthetic fibers are suitable for this purpose. Natural fibers have good mechanical properties, are inexpensive, and are biologically harmless. The use of such natural fibers increases the sustainability of the hollow body composite component produced by a method according to the present disclosure and facilitates its disposal or recycling. Typical natural fibers can be, for example, cotton fibers, flax fibers, hemp fibers, jute fibers, kenaf fibers, ramie fibers, sisal fibers, or wood fibers. Fibers obtained from biopolymers can also be referred to as natural fibers and can be used in the present disclosure. Mineral fibers have very good mechanical properties, but are often more difficult to process. Carbon or aramid fibers have a high mechanical strength and are easy to process.

Combinations of the materials mentioned can be useful when special requirements are made on the mechanical properties of the composite component. For example, a combination of carbon and aramid fibers leads to a high strength by virtue of the carbon fibers, as well as a high impact strength by virtue of the aramid fibers.

A unidirectional alignment of the fibers means a substantially parallel alignment of the fibers, which leads to enhanced mechanical properties in the alignment direction of the fibers. Embedding the fibers in a matrix of plastic simplifies the handling of the fibers and improves the embedding of the fibers in the matrix. Improved embedding of the fibers in turn improves the mechanical properties of the hollow body composite component. When a thermoplastic flowable material is used to form the hollow body composite component, a matrix for the fibers of thermoplastic material is likewise suitable, since the quality of the bond between the matrix of the fibers and the material of the hollow body composite component is enhanced, and the mechanical properties are thus also improved.

According to another variation of a method according to the present disclosure, two strip-shaped reinforcing elements can be arranged on the surface facing the hollow body interior, namely in such a way that the strip-shaped reinforcing elements are situated opposite one another. More uniform reinforcement and thus a more uniform improvement in the mechanical properties of the hollow body component can be achieved by an opposite arrangement of the strip-shaped reinforcing elements. Additional strip-shaped reinforcing elements can promote this effect. Depending on the geometry of the hollow body composite component, it may be advantageous to use strip-shaped reinforcing elements of the same or different widths. It is also possible to use strip-shaped reinforcing elements with a non-constant width. For example, the width of the strip-shaped reinforcing elements can be matched to the contour of the hollow body composite component.

According to yet another variation of a method according to the present disclosure, a two-part injection mold can be used, wherein the strip-shaped reinforcing element is arranged at a point on the surface facing the hollow body interior which is arranged in a parting plane of the injection mold during injection molding. This arrangement of the strip-shaped reinforcing elements can be advantageous, since burrs frequently arise at the parting plane of the injection mold, leading to nonuniform surfaces or material thicknesses of the hollow body composite component. This in turn can represent a mechanical weak point of the hollow body composite component. These points are reinforced by the arrangement of the strip-shaped reinforcing elements at these points. The same principle can also be used in the case of injection molds having more than two parts, in that correspondingly more than two strip-shaped reinforcing elements are inserted and positioned at the corresponding weak points.

According to a further variation of a method according to the present disclosure, the strip-shaped reinforcing element can be arranged in the cavity of the injection mold before the injection of the flowable material. In order to introduce the strip-shaped reinforcing element into the hollow body composite component by the mandrel, the strip-shaped reinforcing element is placed in the cavity of the injection mold and is then brought to the final position in the hollow body composite component by the mandrel in the subsequent fluid injection process. In this way, positioning by the mandrel on the one hand and the process of positioning on the other hand are simplified.

According to an additional variation of a method according to the present disclosure, the strip-shaped reinforcing element can be fixed in the cavity of the injection mold or outside the cavity by at least one end of the strip-shaped reinforcing element, wherein a holding means is used for fixing. Since friction can occur between the reinforcing element and the mandrel during the positioning of the strip-shaped reinforcing element by the mandrel, the reinforcing element may be moved or displaced along the direction of movement of the mandrel. In order to avoid this, at least one end of the reinforcing element can be fixed on the injection mold. In one form of this variation of the present disclosure, the end of the strip-shaped reinforcing element is located substantially behind the mandrel in the direction of movement during the fluid injection process which is fixed. In this case, fixing can be implemented in the region of the cavity, thus making it completely enclosed, for example, by the flowable material of the hollow body composite component and can no longer be recognized in the finished hollow body composite component. However, it is also possible for the strip-shaped reinforcing element to be fixed outside the cavity, which can increase the available installation space for fixing. The holding means itself can be embodied in a wide variety of ways, for example based on a clamping mechanism, a holding device based on positive engagement, by material engagement, or the like.

According to still another variation of a method according to the present disclosure, a plurality of strip-shaped reinforcing elements can be arranged in layers in the cavity of the injection mold and, during injection molding, can be separated from one another by the mandrel and arranged on the surface of the hollow body facing the hollow body interior. A plurality of strip-shaped reinforcing elements is advantageous if the mechanical properties are to be improved as homogeneously as possible over a cross section of the hollow body composite component, transversely to the direction of movement of the mandrel during the fluid injection process. For this purpose, the strip-shaped reinforcing elements can be layered in the cavity of the injection mold and from there separated from one another by the mandrel during the fluid injection process and brought to their final positions.

According to still a further variation of a method according to the present disclosure, instead of the strip-shaped reinforcing element, a tubular reinforcing element can be introduced into the hollow body interior, wherein the tubular reinforcing element is expanded by the mandrel to a diameter of the hollow body. A tubular reinforcing element offers the advantage that the hollow body is reinforced relatively uniformly substantially over its entire cross section. In principle, all tubular structures which can assume the diameter of the mandrel are suitable as tubular reinforcing elements. In particular, this can be a woven hose, a mesh hose, a hose with a lattice structure, a hose made of stretchable material, or the like. During the fluid injection process, the mandrel is driven through the hose and thus brings the hose uniformly up against the inside of the hollow body.

According to another variation of a method according to the present disclosure, the strip-shaped reinforcing element can be guided in a channel formed on the mandrel. For better and more accurate positioning of the strip-shaped reinforcing element, the mandrel may comprise a continuous channel which guides the strip-shaped reinforcing element during the fluid injection process and brings it into the final position. This can be a single independent channel or a single inlet channel in a front region of the mandrel which leads the strip-shaped reinforcing element into an inner region of the mandrel and leads it out again through a single outlet channel in a rear region of the mandrel.

According to yet another variation of a method according to the present disclosure, the strip-shaped reinforcing element can be stored in an interior of the mandrel, in one form by a dispensing device which is arranged in the interior of the mandrel and on which the strip-shaped reinforcing element is rolled up. By storing the strip-shaped reinforcing element in this way, the step of prior positioning of the reinforcing element in the injection mold is eliminated. Furthermore, the strip-shaped reinforcing element does not come unintentionally into contact with the flowable material, as may be the case when the cavity is being filled with flowable material, before it is brought by the mandrel to the correct, desired point in the hollow body composite component. Here, the dispensing device for the strip-shaped reinforcing element is located in the interior of the mandrel. In this case, the strip-shaped element is wound up and mounted on a rotatable shaft. However, unwinding in the conventional sense does not have to be carried out. Storage in some other way is not excluded. It is sufficient if the strip-shaped reinforcing element is stored in the interior of the mandrel and from there is brought to the intended point in the hollow body composite component by the mandrel.

According to an additional variation of a method according to the present disclosure, the strip-shaped reinforcing element can be unrolled from the dispensing device when the mandrel is driven through the flowable material and to be guided out through an outlet of the mandrel. For more accurate positioning and for better bonding to the flowable material of the hollow body composite component, the strip-shaped reinforcing element may to be brought to its intended position through an outlet on the mandrel. This outlet can be, for example, a channel or an opening in the mandrel through which the strip-shaped reinforcing element is guided. A structure in the surface of the mandrel for guiding the strip-shaped reinforcing element would also be conceivable.

As mentioned above, a mandrel is used in a method according to the present disclosure. The mandrel has receiving and/or positioning means for a strip-shaped reinforcing element, by which the strip-shaped reinforcing element can be introduced into the hollow body interior and can be positioned on the surface of the hollow body facing the hollow body interior.

Further areas of applicability will become apparent from the description provided herein. It should be understood that the description and specific examples are intended for purposes of illustration only and are not intended to limit the scope of the present disclosure.

DRAWINGS

Figure 2:
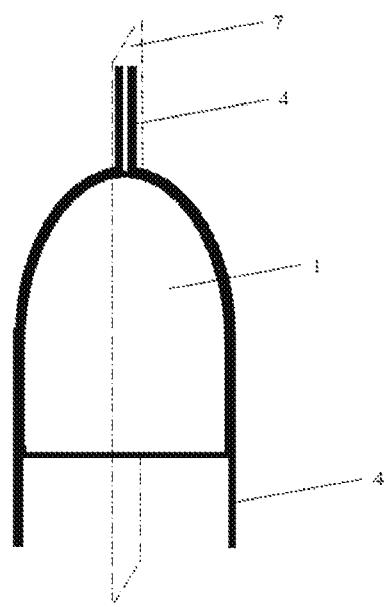
Figure 3:
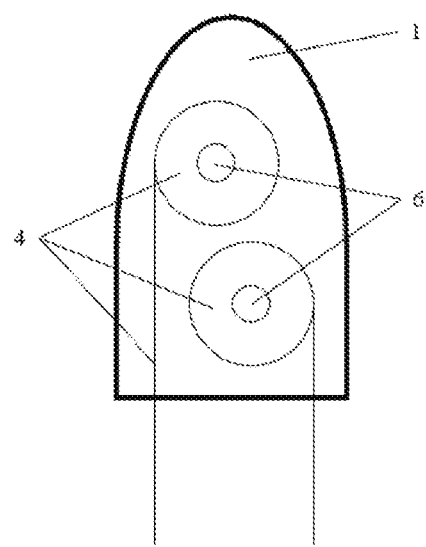

Further features and advantages of the disclosure will be found in the following description of exemplary embodiments of the disclosure, which are not to be understood in a restrictive manner and which will be explained in greater detail below with reference to the drawings. In these drawings:

FIG. 1 is a schematic illustration of one variation of a hollow body composite component produced according to the method of the present disclosure with a strip-shaped reinforcing element introduced by a mandrel;

FIG. 2 is a schematic illustration relating to the insertion of two layered strip-shaped reinforcing elements into a hollow body composite component according to another variation of the present disclosure; and FIG. 3. is a schematic illustration relating to the storage of two strip-shaped reinforcing elements in the interior of a mandrel according to yet another variation of the present disclosure.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, a hollow body composite component produced by a method according to the present disclosure is shown. A mandrel 1 is driven through a flowable material 3 by a fluid 2 after injection of the flowable material 3 into a cavity of an injection mold. During this process, the mandrel 1 takes up the strip-shaped reinforcing element 4 and guides it through the guide channel 5 in the surface of the mandrel 1 to the position in which the strip-shaped reinforcing element 4 is to remain in the hollow body composite component to be produced. In this case, the orientation in space of the strip-shaped reinforcing element 4 can be freely changed by the mandrel 1. The plane 7 can correspond, for example, to a parting plane of a multi-part injection mold and, therefore, the strip-shaped reinforcing element 4 reinforces the parting plane in the finished hollow body composite component.

Referring now to FIG. 2, a variation of the present disclosure in which two layered strip-shaped reinforcing elements 4 are introduced into a hollow body composite component is shown. The mandrel 1 is driven through the flowable material 3 (not shown) with the aid of the fluid 2 and, in the process, separates the layered strip-shaped reinforcing elements 4 in order to bring them into positions at which the strip-shaped reinforcing elements 4 are to be arranged in the hollow body composite component to be produced. The positions may be opposite, as shown in FIG. 2, or may also be arranged asymmetrically.

Referring now to FIG. 3, a further variation of a mandrel 1 according to the present disclosure with a device for storing two strip-shaped reinforcing elements 4 in the interior of the mandrel 1 is shown. The storage device comprises two rotatably mounted rollers 6, on each of which a strip-shaped reinforcing element 4 is stored rolled up. The strip-shaped reinforcing elements 4 are fixed at their free end in such a way that the rolling resistance of the rollers 6 can be overcome and the strip-shaped reinforcing elements 4 are unrolled as the mandrel 1 is driven forward in the flowable material 3 (not shown). A holding means can take over this task, for example. In this way, the strip-shaped reinforcing elements 4 are positioned on the inside of the hollow body and introduced into the flowable material 3.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for producing a hollow body composite component using an injection mold, wherein a cavity of the injection mold is filled at least partially with a flowable material by injection of the flowable material, and then a mandrel is driven through the flowable material to form a hollow body, and wherein, using the mandrel, at least one strip reinforcing element is introduced into an interior of the hollow body and is arranged on a surface of the hollow body facing the interior of the hollow body by the mandrel taking up the at least one strip reinforcing element and guiding the at least one strip reinforcing element through a guide channel in a surface of the mandrel to a position in which the at least one strip reinforcing element is to remain in the hollow body, wherein the at least one strip reinforcing element is stored in an interior of the mandrel, and wherein the at least one strip reinforcing element is stored by a storage device which is arranged in the interior of the mandrel and on which the at least one strip reinforcing element is rolled up.

2. The method according to claim 1, wherein the at least one strip reinforcing element comprises fibers embedded in a matrix of plastic.

3. The method according to claim 2, wherein the fibers comprise unidirectionally aligned fibers.

4. The method according to claim 2, wherein the matrix of plastic is a thermoplastic.

5. The method according to claim 1, wherein two strip reinforcing elements are arranged on the surface of the hollow body facing the interior of the hollow body such that the two strip reinforcing elements are opposite one another.

6. The method according to claim 1, wherein a two-part injection mold is used, and wherein the at least one strip reinforcing element is arranged at a point on the surface of the hollow body facing the interior of the hollow body which is arranged in a parting plane of the injection mold during injection molding.

7. The method according to claim 1, wherein the at least one strip reinforcing element is arranged in the cavity of the injection mold before the injection of the flowable material.

8. The method according to claim 1, wherein the at least one strip reinforcing element is fixed inside the cavity of the injection mold by at least one end of the at least one strip reinforcing element.

9. The method according to claim 1, wherein the at least one strip reinforcing element is fixed outside the cavity of the injection mold by at least one end of the at least one strip reinforcing element.

10. The method according to claim 1, wherein a plurality of strip reinforcing elements are arranged in layers in the cavity of the injection mold and, during injection molding, the plurality of strip reinforcing elements are separated from one another by the mandrel and are arranged on the surface of the hollow body facing the interior of the hollow body.

11. The method according to claim 1, wherein the at least one strip reinforcing element is guided in a channel formed by the mandrel.

12. The method according to claim 1, wherein the at least one strip reinforcing element is unrolled from the storage device when the mandrel is driven through the flowable material and is guided out through an outlet of the mandrel.

13. The method according to claim 1, where the mandrel further comprises a storage device for storing two strip reinforcing elements in an interior of the mandrel, wherein the storage device comprises two rotatably mounted rollers on which the two strip reinforcing elements are stored rolled up.

14. A method for producing a hollow body composite component using an injection mold, wherein a cavity of the injection mold is filled at least partially with a flowable material by injection of the flowable material, and then a mandrel is driven through the flowable material to form a hollow body, wherein, using the mandrel, at least one tubular reinforcing element is introduced into an interior of the hollow body, and wherein the at least one tubular reinforcing element is expanded by the mandrel to a diameter of the hollow body.

15. The method according to claim 14, wherein two tubular reinforcing elements are arranged on a surface of the hollow body facing the interior of the hollow body such that the two tubular reinforcing elements are opposite one another.

16. The method according to claim 14, wherein a two-part injection mold is used, and wherein the at least one tubular reinforcing element is arranged at a point on a surface of the hollow body facing the interior of the hollow body which is arranged in a parting plane of the injection mold during injection molding.

17. The method according to claim 14, wherein the at least one tubular reinforcing element is arranged in the cavity of the injection mold before the injection of the flowable material.

18. The method according to claim 14, wherein the at least one tubular reinforcing element is selected from a group consisting of a woven hose, a mesh hose, a hose with a lattice structure, and a hose made of stretchable material.

* * * * *